US011656376B2

United States Patent
Wen et al.

(10) Patent No.: US 11,656,376 B2
(45) Date of Patent: May 23, 2023

(54) METHOD FOR IDENTIFYING REEF-SHOAL RESERVOIR IN FAULTED LACUSTRINE BASIN BASED ON "BASEMENT STRUCTURE-PALEOGEOMORPHOLOGY-SEISMIC FACIES" PROGRESSIVE CONSTRAINT

(71) Applicant: CHENGDU UNIVERSITY OF TECHNOLOGY, Chengdu (CN)

(72) Inventors: Huaguo Wen, Chengdu (CN); Xin Luo, Chengdu (CN); Cai Peng, Chengdu (CN); Yun Li, Chengdu (CN); Yan Wei, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 17/721,531

(22) Filed: Apr. 15, 2022

(65) Prior Publication Data

US 2022/0342100 A1    Oct. 27, 2022

(30) Foreign Application Priority Data

Apr. 16, 2021    (CN) .......................... 202110409626.8

(51) Int. Cl.
*G01V 1/30* (2006.01)
(52) U.S. Cl.
CPC ............ *G01V 1/30* (2013.01); *G01V 2210/60* (2013.01)
(58) Field of Classification Search
CPC .............................. G01V 1/30; G01V 2210/60
See application file for complete search history.

(56) References Cited

U.S. PATENT DOCUMENTS

| 9,435,903 B2 * | 9/2016 | Bones ................... G01V 1/32 |
| 2018/0372897 A1 | 12/2018 | Colombo et al. |

FOREIGN PATENT DOCUMENTS

| CN | 101980053 A | 2/2011 |
| CN | 102200588 A | 9/2011 |

(Continued)

OTHER PUBLICATIONS

Yanchong Zhang, Kenan Liu, Cai Peng, Huifen Yang and Pingwen Pu; Seismic prediction of high-energy beach reservoirs in the Lower Permian of the Jiulongshan area, western Sichuan Basin; Natural Gas Industry, 2011, 31(6), 42-45; Chuanqing Drilling Engineering Co., Ltd. Geophysical Exploration Company.

(Continued)

*Primary Examiner* — Roy Y Yi
*Assistant Examiner* — Geoffrey T Evans (57) ABSTRACT

A method for identifying a reef-shoal reservoir in a faulted lacustrine basin based on a basement structure-paleogeomorphology-seismic facies progressive constraint, including: analyzing a basement structure of a work area; establishing a paleogeomorphology classification standard according to thickness, reflection structure and stratigraphic dip; based on well-seismic calibration and forward modeling, establishing a seismic facies classification standard for reef-shoal facies belts under different paleo-geomorphic conditions, and quantitatively predicting and describing a reservoir in the reef-shoal facies belts using seismic facies-controlled inversion; and according to analysis results of basement structure characteristic, paleogeomorphology classification and seismic facies, establishing a method for predicting a favorable reservoir.

1 Claim, 6 Drawing Sheets

(56) References Cited

FOREIGN PATENT DOCUMENTS

| | | | |
|---|---|---|---|
| CN | 104977611 | A | 10/2015 |
| CN | 105700016 | A | 6/2016 |
| CN | 106842307 | A | 6/2017 |
| CN | 109343115 | A | 2/2019 |
| CN | 111624651 | A | 9/2020 |
| CN | 111983671 | A | 11/2020 |
| CN | 112394404 | A | 2/2021 |
| WO | 2016171778 | A1 | 10/2016 |
| WO | 2018071632 | A1 | 4/2018 |

OTHER PUBLICATIONS

Bethany L. Ehlmann, Gilles Berger, Nicolas Mangold, Joseph R. Michalski, David C. Catling, Steven W. Ruff, Eric Chassefière, Paul B. Niles, Vincent Chevrier, Francois Poulet; Geochemical Consequences ofWidespread Clay Mineral Formation in Mars' Ancient Crust; Space Sci Rev (2013) 174:329-364; Division of Geological and Planetary Sciences, California Institute of Technology, Pasadena, CA 91125, USA.

\* cited by examiner

METHOD FOR IDENTIFYING REEF-SHOAL RESERVOIR IN FAULTED LACUSTRINE BASIN BASED ON "BASEMENT STRUCTURE-PALEOGEOMORPHOLOGY-SEISMIC FACIES" PROGRESSIVE CONSTRAINT

CROSS-REFERENCE TO RELATED APPLICATIONS

This application claims the benefit of priority from Chinese Patent Application No. 202110409626.8, filed on Apr. 16, 2021. The content of the aforementioned application, including any intervening amendments thereto, is incorporated herein by reference in its entirety.

TECHNICAL FIELD

This application relates to oil-gas geological exploration, and more particularly to a method for identifying a reef-shoal reservoir in a faulted lacustrine basin based on a basement structure-paleogeomorphology-seismic facies progressive constraint.

BACKGROUND

Lacustrine carbonate rocks are mainly developed in the Mesozoic and Cenozoic, and are distributed in paleo-lake environments from Triassic to Tertiary. The lacustrine carbonate rocks are a special reservoir in continental hydrocarbon-bearing basins, and oil and gas are found in worldwide lacustrine carbonate rocks such as the Paleogene reef limestone in the Jiyang Depression in the Bohai Bay Basin, China; the shell limestone of the Middle Jurassic Da'anzhai Formation in the Sichuan Basin, China; reef biolithite of Miocene Youshashan Formation and Eocene Ganchaigou Formation in the western Qaidam Basin, China; the Campos Basin, Brazil; Precaspian Basin, Russia; and the Green River basin, US. Nevertheless, the wide variety of reservoir, complex lithology and large differences in reservoir performance makes the lacustrine carbonate rock hard to predict, hindering the exploration and development of oil and gas.

The largest lacustrine biolithite is developed in the favorable exploration basins in the West Africa-South America waters. The development degree of the reservoir is a key factor to determine whether the oil-gas enrichment and accumulation can be reached. However, the deposition mechanism, temporal and spatial evolution of the lacustrine biolithite are not fully understood; the development conditions, genetic mechanism and main controlling factors of lacustrine biolithite reservoirs are unclear; and the exploration and well deployment in favorable areas are hindered by methods for evaluating lacustrine limestone reservoirs and predicting favorable reservoir development areas. Large-scale lacustrine carbonate gas reservoirs in the Santos Basin are dominated by lithologic gas reservoirs in faulted lacustrine basins, and the reservoirs are developed dominant reservoir facies belts such as microbial reefs and shell beaches. Due to the uneven distribution of wells, the poor quality of seismic data and the complex reflection characteristics of reservoirs in the study area, it is extremely difficult to carry out the reservoir prediction. Therefore, it is urgently needed to develop a method for identifying a lacustrine reef-shoal reservoir in such study area.

SUMMARY

An objective of the present disclosure is to provide a method for identifying a reef-shoal reservoir in a faulted lacustrine basin based on a basement structure-paleogeomorphology-seismic facies progressive constraint. According to characteristics of a large-scale lacustrine limestone developed in the faulted lake basin, the method provided herein establishes a geology-geophysics-integrated reservoir evaluation standard based on the basement structure-paleogeomorphology-seismic facies progressive constraint, so as to identify a favorable reef-shoal reservoir in the faulted lacustrine basin.

The technical solutions of the present disclosure are described as follows.

A method for identifying a reef-shoal reservoir in a faulted lacustrine basin based on a basement structure-paleogeomorphology-seismic facies progressive constraint, the method comprising:

(1) analyzing a basement structure of a work area to obtain a basement structure characteristic of the work area, expressed as follows:

$$G = \text{Analyse}(S);$$

wherein S is seismic data; Analyse(•) represents basement structure analysis on the seismic data; and G is a basement structure analysis result;

(2) establishing a paleogeomorphology classification standard according to thickness, reflection structure and stratigraphic dip to determine types of paleogeomorphology, so as to determine a development characteristic of different paleo-geomorphic reefs and shoals, expressed as follows:

$$AI = \text{Norm}(H, R, D)$$

wherein H is the thickness; R is the reflection structure; D is the stratigraphic dip; Norm(•) is the paleogeomorphology classification standard; and AI is a paleogeomorphology type;

(3) analyzing a seismic facies characteristic of lacustrine biolithites in different paleo-geomorphic parts through well-seismic fine calibration and forward modeling; and establishing a reef-shoal identification method based on a paleogeomorphology-and-seismic facies constraint, expressed as follows;

$$M = F[AI, SF(ws, nm)]$$

wherein ws is a result of the well-seismic fine calibration; nm is the forward modeling; SF(•) is a seismic facies analysis; F(•) represents method construction; and M represents the reef-shoal identification method based on the paleogeomorphology-seismic facies constraint;

is the paleogeomorphology and seismic facies-constrained method;

(4) combining with the basement structure analysis result, establishing a geology-geophysics-integrated reservoir evaluation standard based on the basement structure-paleogeomorphology-seismic facies progressive constraint, expressed as follows: Cn=B(G,M).

wherein B(•) indicates progressive constraining; Cn is the geology-geophysics-integrated reservoir evaluation standard;

(5) identifying a favorable reef-shoal reservoir in the faulted lacustrine basin based on the basement structure-paleogeomorphology-seismic facies progressive constraint; and repeating steps (1) to (5) until data interpretations of the entire work area are processed, so as to obtain a prediction result of the favorable reef-shoal reservoir in the faulted lacustrine basin of the work area; wherein the prediction result provides support for subsequent reservoir fine evaluation and drilling deployment.

The beneficial effects of the present disclosure are described as follow.

(1) A paleogeomorphology classification standard based on thickness, reflection structure and stratigraphic dip is established, and can divide the paleogeomorphology into different types and determine a dominant sedimentary facies belt of each type of the paleogeomorphology.

(2) Through well-seismic calibration and forward modeling, the method provide herein is capable of describing the seismic facies characteristic of the lacustrine biolithites in different paleo-geomorphic parts. In addition, the reef-shoal identification method based on the paleogeomorphology-seismic facies constraint is capable of improving an accuracy of predicting the favorable reef-shoal reservoir.

(3) The method provided herein establishes a high-level geophysics-integrated standard for identifying a reservoir. In addition, combining with the geophysical reservoir prediction model, step-by step progressive constraining can improve an accuracy for identifying the reservoir.

BRIEF DESCRIPTION OF THE DRAWINGS

FIGS. 2A-2B show a basement structure analysis result of a work area according to an embodiment of the present disclosure, where FIG. 2A: plane distribution diagram; and FIG. 2B: two-dimensional well-through cross-sectional view;

DETAILED DESCRIPTION OF EMBODIMENTS

The embodiments of the present disclosure are described as follows.

(1) Post-stack data of a work area is subjected to a structural interpretation. Specifically, a sequence-stratigraphic framework is determined through finely interpreting a two-dimensional cross-sectional view, and a characteristic of a basement structure in the work area is obtained through three-dimensionally analyzing the basement structure.

(2) A paleogeomorphology classification standard constrained according to thickness, reflection structure and stratigraphic dip is established to classify paleogeomorphology types of the work area, so as to define a development characteristic of different paleo-geomorphic reefs and shoals.

(3) Well-seismic fine calibration and forward modeling are carried out to determine a seismic facies characteristic of lacustrine biolithites in at different paleo-geomorphic parts.

(4) A geophysical reservoir prediction model is established. In an embodiment, an accurate prediction model is established based on facies-controlled inversion, prediction of reservoir porosity and thickness, and interpretation of logging data.

(5) Combining a basement structure analysis result obtained in step (1), a paleogeomorphology analysis result obtained in step (2), a seismic facies analysis result obtained in step (3) and the geophysical reservoir prediction model obtained in step (4), a geophysics-integrated reservoir evaluation standard is established based on basement structure, paleogeomorphology and seismic facies.

(6) An identification of a favorable lacustrine reef-shoal reservoir is carried out using the geophysics-integrated reservoir evaluation standard.

(7) Steps (1)-(6) are repeated to evaluate different strata of the work area, so as to identify favorable lacustrine reef-shoal reservoirs in different strata of the whole work area.

The embodiments of the present disclosure will be further described below with reference to the accompanying drawings to render the technical solutions and beneficial effects clearer.

Figure 1:
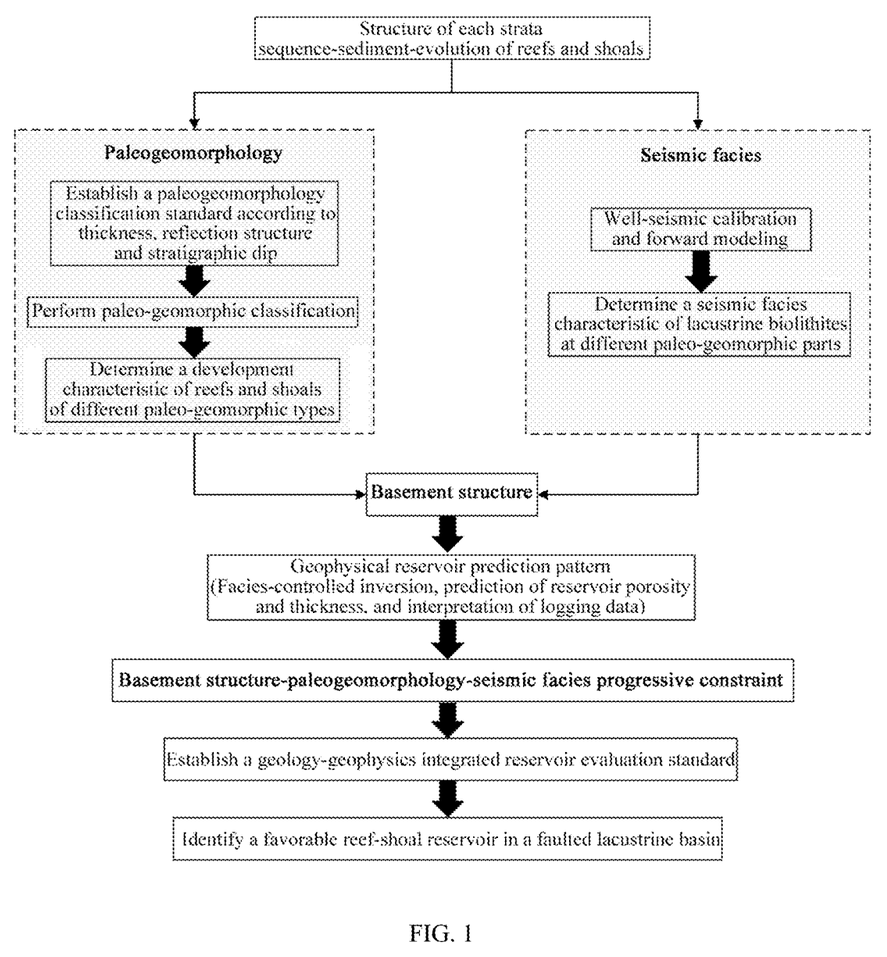
FIG. 1 schematically depicts a method for identifying a reef-shoal reservoir in a faulted lacustrine basin based on a basement structure-paleogeomorphology-seismic facies progressive constraint according to an embodiment of the present disclosure.

FIG. 1 is a technical roadmap of a method for identifying a reef-shoal reservoir in a faulted lacustrine basin based on a basement structure-paleogeomorphology-seismic facies progressive constraint. As shown in FIG. 1, a comprehensive analysis is performed to predict a favorable lacustrine reef-shoal reservoir using the method provided herein. The method provided herein is capable of predicting the favorable lacustrine reef-shoal reservoir with high precision.

Figure 2A:
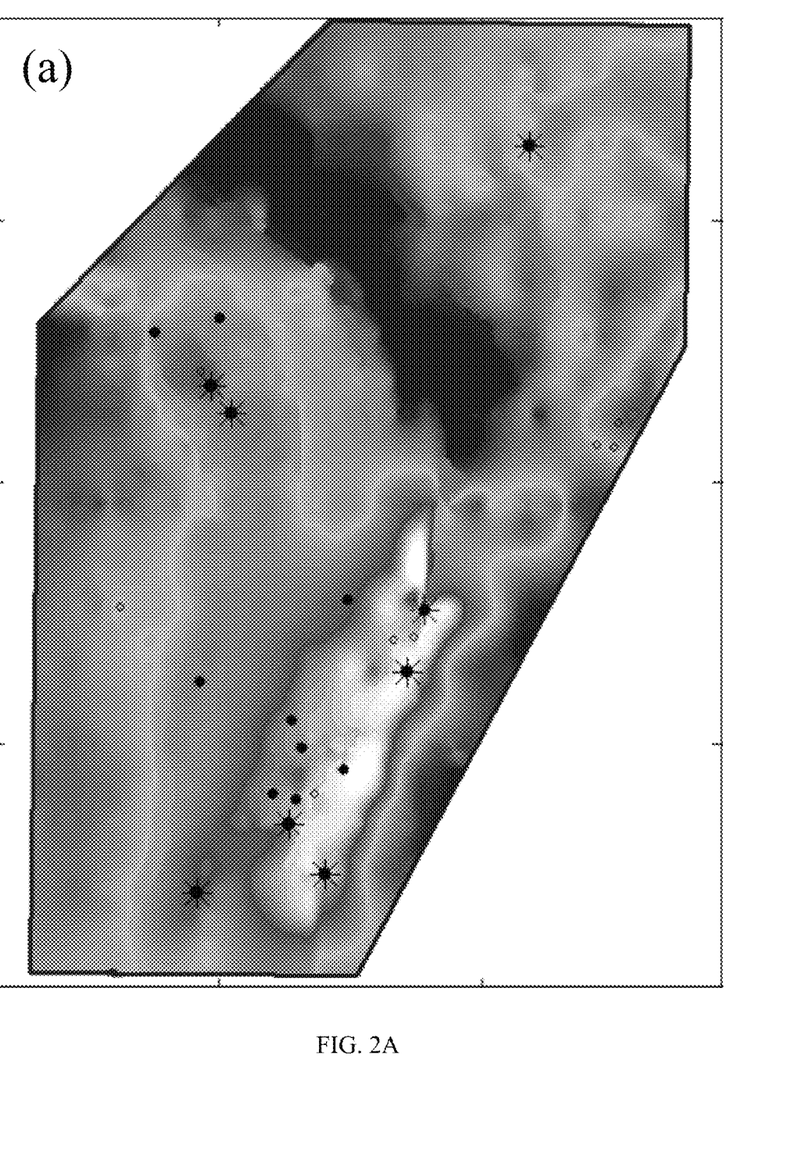
Figure 2B:
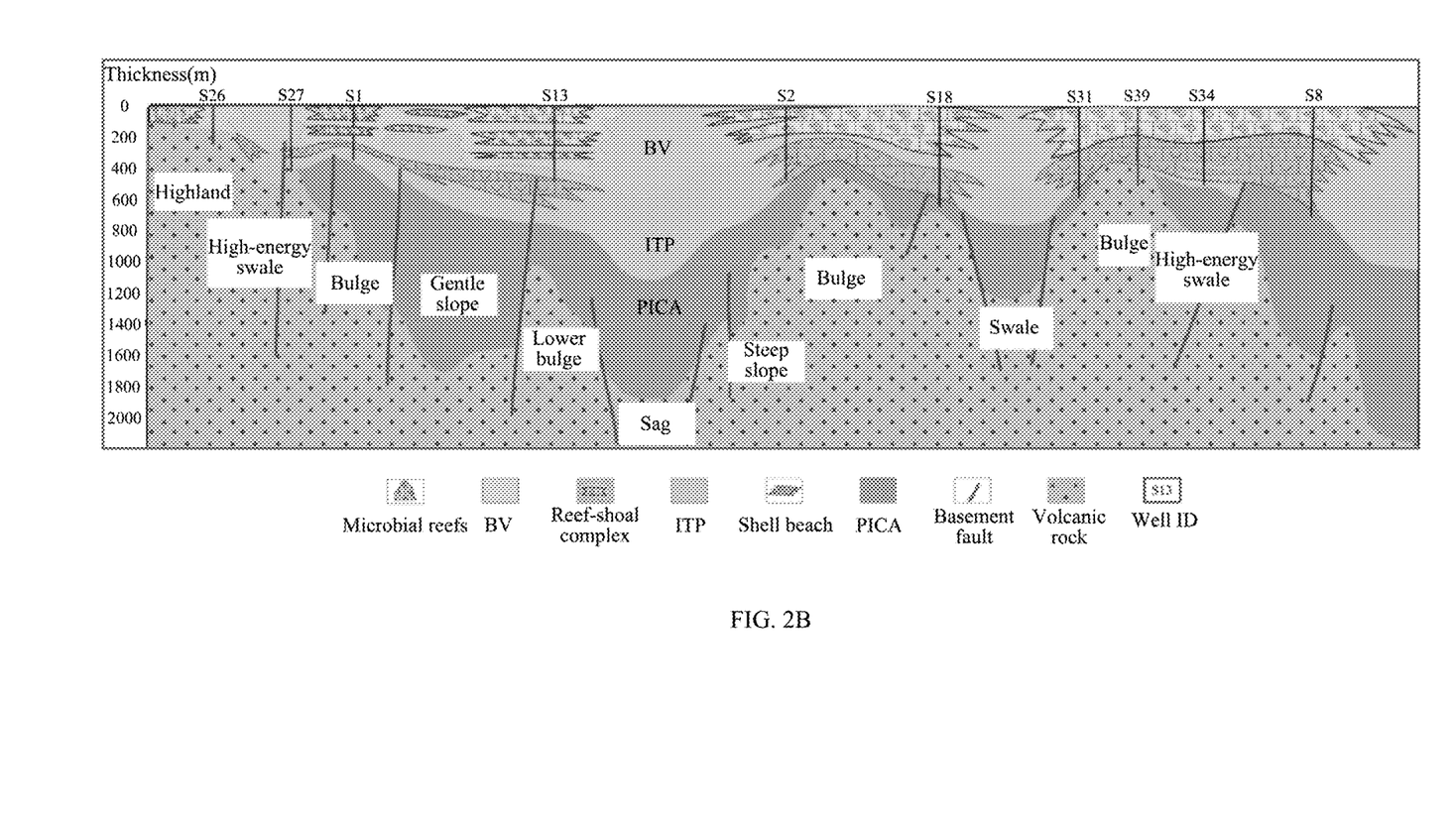

FIGS. 2A-2B show a basement structure analysis result of the work area. FIG. 2A is a plane distribution diagram of the basement structure, which clearly shows an overall characteristic of the basement structure and provides a basis for determining development of a favorable reservoir.

FIG. 2B shows a two-dimensional cross-sectional view of a well-through basement structure. As shown in FIG. 2B, the basement structure in the work area is well-developed, and is dominated by bulges.

Figure 3:
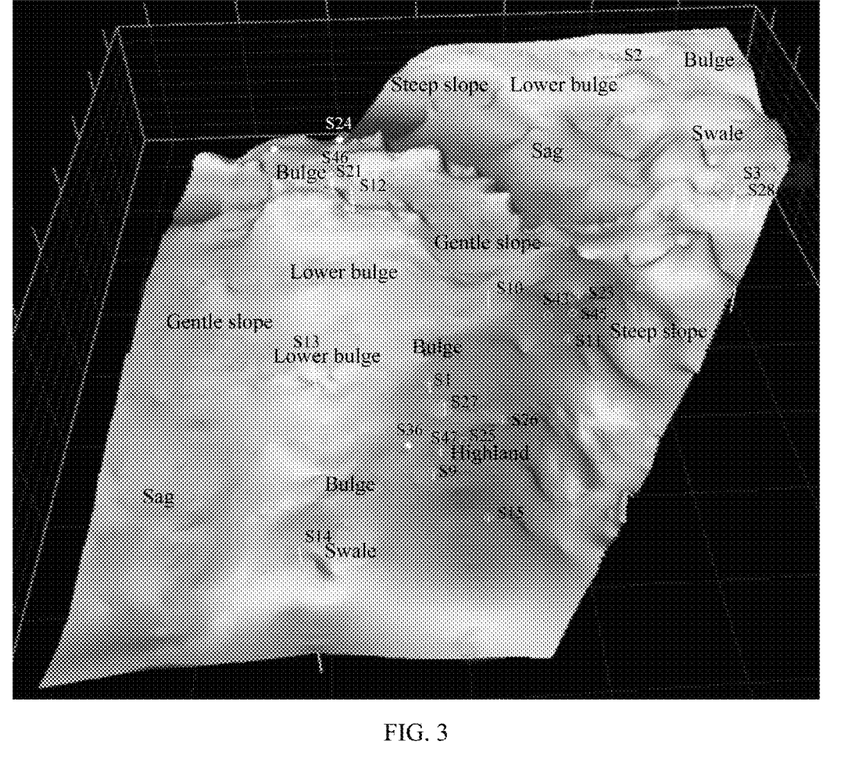
FIG. 3 shows a paleogeomorphology diagram of the work area obtained using the method according to an embodiment of the present disclosure.

FIG. 3 shows a three-dimensional visualization distribution map of the paleogeomorphology before a three-dimensional sediment of an Itapema Formation (ITP) group. As shown in FIG. 3, an uplift belt is developed along a southwest-to-northeast direction in an eastern subsalt part of the work area, where a west side of the uplift belt is gentle and an east side of the uplift belt is steep; a northern part of the work area is controlled by two uplifts, and two depressions along a northwest-to-southeast direction are developed, forming a three-uplift-and-two-depression paleogeomorphology pattern in subsalt of the work area. A plurality of secondary steps exists in such paleogeomorphology pattern, and controls a distribution range and scale of reef-shoal bodies in a Barra Vleha Formation (BV) group and the ITP group.

Figure 4:
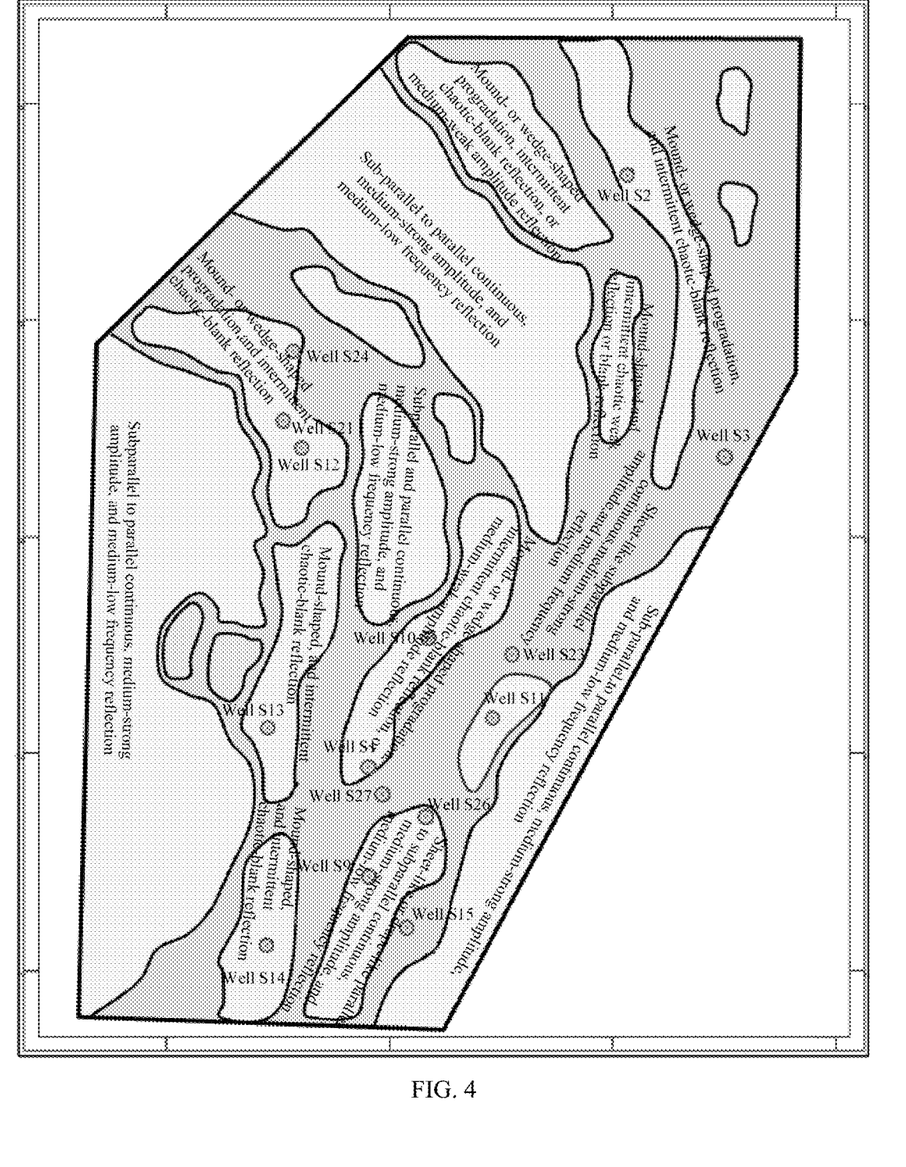
FIG. 4 shows a seismic facies diagram of the work area obtained using the method according to an embodiment of the present disclosure.

FIG. 4 shows a seismic facies distribution of the BV group in the three-dimensional work area determined using the method provided herein. It can be seen that definite seismic facies types are mainly divided into six categories: (1) wedge-shaped progradation or drape-like intermittent chaotic-blank reflection or reflection with a medium-strong amplitude and a medium-low frequency; (2) wedge-shaped progradation or sill-like sheet-like imbricate-parallel-subparallel continuous reflection with a medium-strong amplitude and a medium-high frequency; (3) subparallel continuous reflection with a strong amplitude and a low frequency; (4) parallel-subparallel continuous reflection with a medium-strong amplitude and a medium-high frequency; (5) parallel-subparallel continuous reflection with a medium-weak amplitude and a medium-low frequency; and (6) parallel continuous reflection with a strong amplitude and a medium-low frequency.

Figure 5:
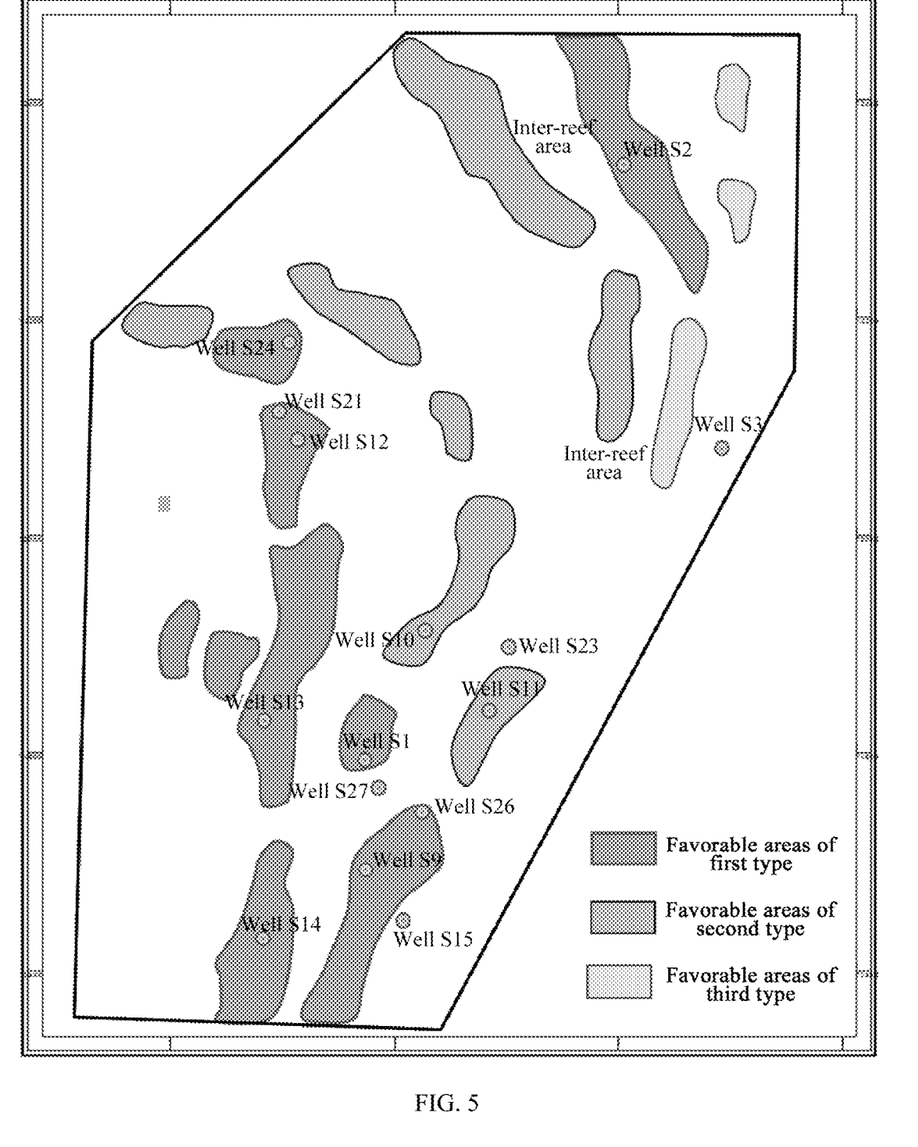
FIG. 5 shows a comprehensive evaluation diagram of favorable reef-shoal reservoirs in a faulted lacustrine basin through processing the work area using the method according to an embodiment of the present disclosure.

FIG. 5 is a distribution map of favorable areas for developing a reef reservoir of the BV group in the work area, and the distribution map is predicted using the method provided herein. It is believed that the favorable areas are mainly divided into three types. A first type of the favorable areas is generally located in an uplift area on an edge of a sag of the No. 1 seismic facies and the No. 2 seismic facies. The favorable areas of the first type are located on a windward side with strong sedimentary hydrodynamics and developed reef core microfacies. For example, Well S13 encountered stromatolitic biogenic limestone with a thickness of 558 m during drilling; Well S21 encountered stromatolite biogenic limestone with a thickness of 427 m during drilling. Reefs are large in scale and easy to form a reef limestone reservoir. The favorable areas of the first type have a medium-and-low impedance and a total area of 599 km$^2$. A second type of the favorable areas is located at a vanishing end of a sag or a bulge area on an edge of a sag, and has a smaller accommodation space and a weaker sedimentary hydrodynamics when compared with the first type of the favorable areas. For example, Well S2 encountered stromatolite biogenic limestone with a thickness of 353 m during drilling; Well S1 encountered stromatolite biogenic limestone with a thickness of 295 m during drilling; and Well 26 encountered stromatolite biogenic limestone with a thickness of 131 m during drilling. Thickness of the reef reservoir is significantly reduced. The favorable areas of the second type have a medium impedance and a total area of 244 km$^2$. A third type of the favorable areas is located in a shallow lake area with low-energy still water. In terms of the favorable areas of the third type, the sedimentary hydrodynamics is weak, a reef-shoal body is relatively thin, and the reservoir is underdeveloped. The favorable areas of the third type have high impedance, and are not found in the work area during well drilling. A total area of the favorable areas of the third type in the three-dimensional work area is 127 km$^2$.

The embodiments mentioned above are merely illustrative of the present disclosure, and are not intended to limit the disclosure. Any variations and modifications made by those skilled in the art without departing from the spirit of the present disclosure should fall within the scope of the present disclosure defined by the appended claims.

What is claimed is:

1. A method for identifying a reef-bank reservoir in a faulted lacustrine basin based on a basement structure-paleogeomorphology-seismic facies progressive constraint, the method comprising:
   (1) analyzing a basement structure of a work area to obtain a basement structure characteristic of the work area, expressed as follows:

$G=\text{Analyse}(S)$;

wherein S is seismic data; Analyse(•) represents basement structure analysis on the seismic data; and G is a basement structure analysis result;
   (2) establishing a paleogeomorphology classification standard according to thickness, reflection structure and stratigraphic dip to determine types of paleogeomorphology, so as to determine a development characteristic of different paleo-geomorphic reefs and banks, expressed as follows:

$AI=\text{Norm}(H,R,D)$;

wherein H is the thickness; R is the reflection structure; D is the stratigraphic dip; Norm(•) is the paleogeomorphology classification standard; and AI is paleogeomorphology type;
   (3) analyzing a seismic facies characteristic of lacustrine biolithites in different paleo-geomorphic parts through well-seismic fine calibration and forward modeling; and establishing a reef-bank identification method based on a paleogeomorphology-seismic facies constraint, expressed as follows:

$M=F[AI,SF(ws,nm)]$;

wherein ws is a result of the well-seismic fine calibration; nm is the forward modeling; SF(•) is a seismic facies analysis; and F(•) represents method construction; and M represents the reef-bank identification method based on the paleogeomorphology-seismic facies constraint;
   (4) combining with the basement structure analysis result, establishing a geology-geophysics integrated reservoir evaluation standard based on the basement structure-paleogeomorphology-seismic facies progressive constraint, expressed as follows:

$Cn=B(G,M)$;

wherein B(•) indicates progressive constraining; Cn is the geology-geophysics integrated reservoir evaluation standard;
   (5) identifying a favorable reef-bank reservoir in the faulted lacustrine basin based on the basement structure-paleogeomorphology-seismic facies progressive constraint; and
   repeating steps (1) to (5) until data interpretations of the entire work area are processed, so as to obtain a prediction result of the favorable reef-bank reservoir in the faulted lacustrine basin of the work area; and
   (6) locating different types of favorable areas based on the prediction result of the favorable reef-bank reservoir, and drilling wells in the work area according to the different types of favorable areas.

* * * * *